Nov. 21, 1944. J. TAEYAERTS ET AL 2,363,272

DIAMOND TIPPED TOOL AND METHOD OF MAKING THE SAME

Filed July 10, 1942

INVENTORS.
Jan Taeyaerts,
BY Magnus Toelcke,
Ernest A. Wegner
their Atty.

Patented Nov. 21, 1944

2,363,272

UNITED STATES PATENT OFFICE 2,363,272

DIAMOND-TIPPED TOOL AND METHOD OF MAKING THE SAME

Jan Taeyaerts, Villa Park, and Magnus Toelcke, Chicago, Ill.

Application July 10, 1942, Serial No. 450,402

16 Claims. (Cl. 125—39)

The invention relates generally to tools tipped with cutting or abrading elements permanently embedded therein, and more particularly to the method of making tools of that character.

A general object of the invention is to provide a new and improved method of the character described and as a result a new and improved tool.

It is a more particular object of this invention to provide a new and improved method permitting the embedding or setting of the diamond or other cutting element with the highest precision.

Another object of the invention is to provide a method of such greatly improved and simplified technique as to permit the accurate setting of the cutting element with greater precision but in less time and with less skilled labor than heretofore.

Still another object is to provide a new and improved method of the character described which permits the employment of a solder as hard as a solder can be made and still flow.

A further object is to provide a method of the character described in which there is no wastage of solder and in which the cutting or abrading element is at no time exposed to a direct flame.

Other objects and advantages will become apparent from the following detailed description, taken in connection with the accompanying drawing, in which.

While the method of this invention is applicable to a large variety and type of tools, it will, for purposes of disclosure, herein be described in connection with two tools only. It is not intended, however, that the method be limited in its application to the two tools shown. On the contrary, it is intended to cover the method as adapted to any tools and in any manner falling within the spirit and scope of the invention as defined in the appended claims.

For exemplary purposes, the invention will first be described as employed in the manufacture of a tool having but a single cutting or abrading element embedded therein, such as the tool shown in Figs. 1 to 4. Such a tool commonly has a holder or shank 10 formed from a solid rod of iron or steel. In accordance with the invention, this shank is first drilled axially to form a small recess 11 opening through one end or face of the shank. This recess 11 is just slightly larger in diameter than the major transverse dimension of the abrading element, here shown as a diamond 12, to be inserted therein, and preferably also is shallower than the major or longitudinal axis of the diamond by the extent to which the diamond is to project from the shank 10 when the tool is completed. Next a small, lateral passage 13 is drilled in the shank. This passage preferably opens at its inner end to the bottom of the recess 11 and extends radially outwardly and somewhat downwardly, as clearly seen in each of Figs. 2 to 4. This passage serves both as a draining passage and also as a feeder passage, as will later become more apparent.

Figure 2:
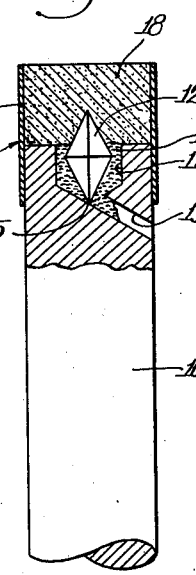
Fig. 2 is an enlarged view partially in diametrical section at right angles to the plane of Fig. 1, and showing the tool in an intermediate stage in the method of manufacture.
Figure 3:
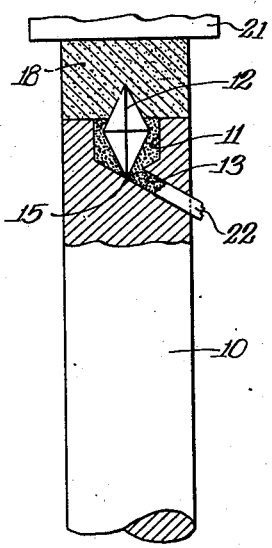
Fig. 3 is a view similar to Fig. 2 but showing the tool in still a later stage in the manufacture.
Figure 4:
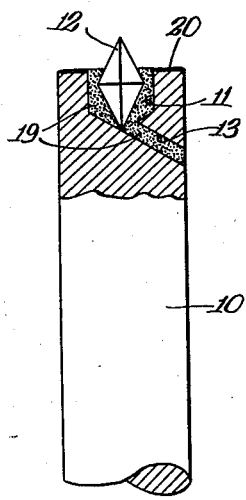
Fig. 4 is a view similar to Fig. 2 but showing the tool completed save for cleaning and finishing.

With the shank 10 thus formed with the recess 11 and the passage 13, it is suitably supported usually and preferably in upright position, as shown in Figs. 2 to 4, in preparation for the partial embedding of the diamond in a first temporary holding medium. This temporary holding medium preferably is one that is readily made substantially to fill the recess 11, one that in its set condition is not completely rigid but remains somewhat plastic, and which by the application of heat may be liquified or even vaporized to facilitate removal. Among the compounds suitable, and in fact the preferred compound, is wax, which is then flowed into the recess 11 as represented by the reference character 14. Before the wax sets, the diamond 12 is inserted into the wax in the recess in proper centered position with the desired point projecting out of the wax and out of the recess, and also with the diamond projecting to the desired degree to which it will project from the finished tool. Where possible, the depth of the recess 11, as already stated, is so gaged that when the diamond is inserted in its desired position the inner tip thereof will rest in the apex 15 of the recess formed by the drill. The diamond 12 is held in this position until the wax or other compound 14 sets. After the wax is set, the tool in this stage may be mounted in a lathe and tested for accurate and precise centering of the diamond and particularly the projecting tip of the diamond. Should the diamond be slightly off center, this may readily be corrected at this stage because the wax, even when set, is sufficiently pliable and moldable to permit the few thousandths of an inch correction that may be necessary. It will be apparent that this centering may be done leisurely and hence to the complete satisfaction of the artisan, because there is no necessity of completing the adjustment before a soldering compound hardens into final, immovable position, as was the case in the old practice where the diamond was initially placed into molten solder filling the recess. A precision and accuracy of the very highest degree and far beyond anything heretofore obtainable thus results.

When the diamond 12 is finally centered, it will, of course, be held in position by the wax 14. The tool is then removed from the lathe and any wax that has overflowed the recess 11 is preferably cleaned off of the end of the shank 10 and the tool is then again secured in upright position. There is then applied to the end of the shank 10 a generally cup-shaped mold 16 which is conveniently and readily formed by the application to the end of the shank of a strip of stiff tape 17. This strip of tape is applied so that it projects a goodly distance beyond the end of the shank 10 and even beyond the projecting tip of the diamond 12. With the mold thus formed, conditions are proper for the next step in the method, namely, the embedding of the remaining projecting portion of the diamond in a second, temporary holding medium. This second, temporary holding medium should be a heat resistant compound and usually is an investment compound, such as plaster of Paris. The mold is completely filled with this investment compound, indicated by the reference character 18. This investment compound will, of course, surround and grip the portion of the diamond projecting out of the wax and thus will serve to hold the diamond in the same precisely adjusted position in which it is held by the wax. The tool is now in that stage illustrated in Fig. 2, and at this stage slight pressure is brought to bear against the investment compound 18 through some suitable means diagrammatically represented at 21 to hold the same more or less tightly against the end of the shank 10.

The first temporary holding medium is now removed, in this instance by the application of heat to the end of the tool to liquify and vaporize the wax 14 which is then either absorbed by the porous investment compound 18 or flows out through the downwardly inclined passage 13, leaving the entire recess 11, and hence all of the space about the portion of the diamond within the recess, free and open for the reception of a permanent holding medium in which the diamond is finally and permanently set. This permanent holding medium is, of course, a metallic compound, such as various well known types of solder. The tool is now in the stage illustrated in Fig. 3, but while the wax 14 has been removed the diamond is still, through the medium of the investment compound 18 which had previously been cast about its projecting tip, firmly retained in the exact, same position to which it was previously so precisely and accurately adjusted. The investment compound alone is efficient to hold the diamond in its adjusted position. However, in instances such as that here illustrated, where the depth of the recess 11 has been so accurately gaged that the inner tip of the diamond rests in the apex 15 of the recess, additional support for the diamond is thus provided, thus further assuring that the diamond will not be displaced.

Figure 1:
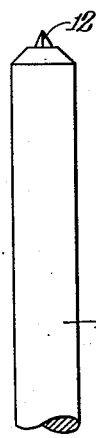
Fig. 1 is a side elevational view of a completed single diamond tipped tool made by the method and embodying the features of this invention.

When all of the wax has been burned out of the recess 11, and while the shank 10 is in this heated condition, a ribbon or rod of solder, indicated at 22 in Fig. 3, is fed through the passage 13 where it melts from the heat of the shank 10 and, by the pressure caused by the continued feeding of the rod into the passage 13, caused to flow completely around the diamond 12 and completely fill the recess 11, as well as the passage 13. The rod of solder is fed into the passage 13 until it is forced outwardly of the recess between the end of the shank 10 and the investment compound 18. This will be visible to the artisan because the strip of tape 17 will have been burned off by the application of the torch to the end of the tool during the burning out of the wax 14, and is an accurate indication that the recess 11 has been completely filled with the solder. It is to be noted that even the formation of air pockets in the recess is prevented by this method. With the solder being fed upwardly from the bottom of the recess, it will as it rises in the recess drive ahead of it any air that may be in the recess, and this air will escape through the porous investment compound 18. After the solder has solidified, the investment compound 18 is broken away and the tool appears as shown in Fig. 4, with the recess 11 as well as the passage 13 now completely filled with the solder, herein designated 19. A thin layer of solder 20 will also overlie the end of the shank 10. The tool is now complete save for cleaning and finishing. Usually the shank is rounded or tapered, depending upon the purpose to which the tool is to be put, so that in its final form it will appear as shown in Fig. 1.

It is believed apparent from the foregoing that the method is highly advantageous over the methods heretofore employed. As already stated, much higher precision and accuracy in the mounting of the diamond is obtainable, and this higher precision is even obtainable by less skilled artisans. The method is readily and quickly performed, so as to reduce labor costs and, of course, the reduction in material costs are phenomenal because the high accuracy obtainable reduces to a very minimum any discards of imperfectly finished tools. The method provides assurance not only in precision in mounting the diamonds, but also assures that certain points or facets of the diamond will be exposed and guards against a turning of the diamond during the flowing in of the solder. Moreover, the method requires a minimum of solder and totally eliminates any waste of solder. The method also avoids any direct application of a heating flame to the diamond, and thus obviates all possibility of burning the diamond, or of removing the polish which in certain instances is required, and which, of course, must be applied before the diamond is mounted in the tool. This polish can never be reapplied once the diamond is mounted in the tool, and hence any removal of the polish by exposure of the diamond to a direct flame is fatal.

Figure 5:
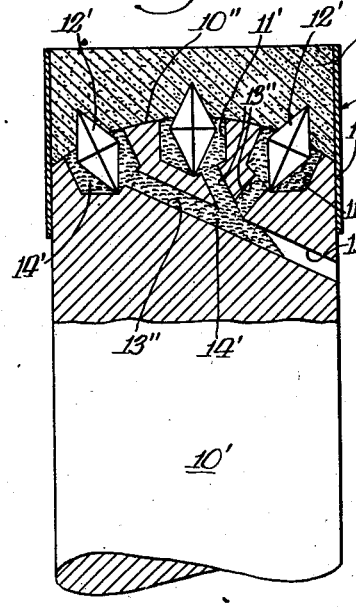
Fig. 5 is an enlarged view partially in diametrical section along the line 6—6 of Fig. 7, showing in a stage comparable to Fig. 2 a multiple-diamond tipped tool manufactured by the method of this invention.
Figure 6:
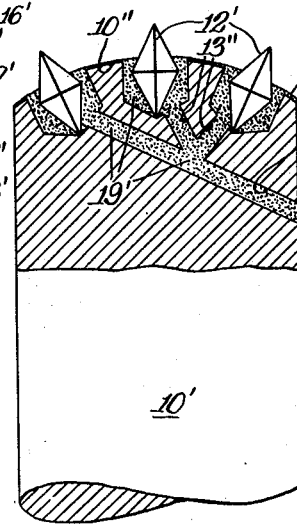
Fig. 6 is a view similar to Fig. 5 showing the tool completed save for cleaning and finishing.
Figure 7:
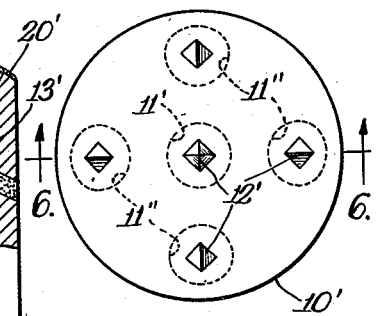
Fig. 7 is an end elevational view of the tool of Fig. 6.

While the method has above been described in conjunction with the manufacture of a single diamond tipped tool, it is believed obvious that it is equally applicable and equally advantageous in the manufacture of multiple-element tipped tools of substantially any shape or configuration. By way of example, and in no way intended as limiting the invention to the particular tool shown, the invention will now briefly be described as employed in the manufacture of a multiple-diamond tipped tool, shown in Figs. 5 to 7. Such a tool again may have a solid shank 10' of iron or steel. By way of example, the shank 10' is here shown as having a slightly rounded or curved end or nose 10'', and is also shown as eventually carrying five diamonds or other abrading elements 12', though the number is not material. With the diamonds 12' arranged as best seen in Fig. 7, a central recess 11' would be drilled axially and centrally into the end 10'' of the shank 10', while the peripheral recesses 11'' would be drilled slightly obliquely to the recess 11', so as to be normal to the slightly curved end or nose 10'', as clearly seen in Figs. 5 and 6. Next a passage 13' would be formed with extensions or branches 13'' thereof communicating with the recesses 11' and 11'' and extending to open outwardly of the shank 10', preferably slightly downwardly and externally of the shank, as shown in Figs. 5 and 6.

The recesses and passage thus formed would next be filled with a suitable, first temporary holding medium 14', such as wax, and into the recesses thus filled would be inserted the diamonds 12' and held until the wax had set sufficiently to prevent the diamonds from sinking deeper into the recesses. The diamonds are, as above stated, positioned in the position which they are intended to have in the final completed form of the tool, which means that they are positioned with a portion thereof projecting outwardly of the wax and the recesses. The tool is then supported in upright position and a cup-like mold 16' is again formed over the end thereof. Here again this mold is readily and conveniently formed by the attachment of a strip of stiff tape 17' surrounding the shank 10' and projecting beyond the end of the shank a substantial distance. The mold is then filled with a second, temporary holding medium 18', such as an investment compound, which of course surrounds and securely retains therein the projecting portion of each of the diamonds 12'. After the investment compound has set, heat is applied to the end of the tool to drive off the wax 14' which either runs out of the passage 13' as a liquid or vaporizes and escapes through the porous investment compound 18'. Though the wax is now removed, the diamonds 12' are kept in the precise position to which they were adjusted in the wax, because of the support thereof by the investment compound 18', yet the recesses 11' and 11'' are free and open for the reception of the metallic compound, that is, the solder in which the diamonds are eventually and permanently set. This metallic compound is now flowed into the recesses through the passage 13' and conveniently this may be done by inserting through the passage 13' a rod or ribbon of solder. As it is pushed through the passage 13', it is melted by the heat in the shank 10' and is, by the pressure of the rod being forced up the passage 13', in turn caused to fill the recesses 11' and 11'' flowing into all of the corners and interstices and upwardly about the diamonds 12'. Solder is continued to be forced into the passage 13' until it flows out between the end of the shank 10' and the investment compound 18' forming a thin layer 20'' over the nose of the tool, as seen in Figs. 6 and 7. Throughout the stage of removal of the wax and the insertion of the metallic compound, the investment compound 18' is, as above stated, maintained under light pressure urging it onto the end of the shank 10' so as to prevent its being too readily lifted off of the shank by the pressure of the solder within the recesses. After the metallic compound or solder has set, the investment compound 18' is broken away and the tool appears as shown in Fig. 6, that is, with the recesses and the passage filled with metallic compound 19'. The tool is now finished save for cleaning and possibly shaping the end of the tool to give it the desired contour.

It will be apparent that there is no difference in the method as applied to a multiple-diamond tipped tool over the method as applied to a single diamond tipped tool save in the particular disposition of the recesses and passage and the fact that the investment compound secures all of the diamonds. Thus it is believed readily apparent that any one skilled in the art can, without departing from the spirit and scope of the invention, apply the method to a great variety of tools simply by arranging the recesses so that they meet in a common point or connect with a common passage, such as the passage 13' opening outwardly of the shank or holder.

We claim as our invention:

1. The method of securing a diamond or similar cutting or abrading element in a holder including the steps of forming in the holder a recess in which the element is to be secured while projecting partially from the recess, partially embedding the element in the position it is ultimately to assume in a first temporary holding medium located in the recess, embedding the remainder of the element in a second temporary holding medium carried by the holder, removing the first temporary holding medium while the second temporary holding medium remains in position on said holder and while the element is retained in position in the recess in the holder by the second temporary holding medium, and flowing into the space created by removal of the first temporary holding medium a permanent holding medium.

2. The method of securing a diamond or similar cutting or abrading element in a holder including the steps of forming in the holder a recess in which the element is to be secured while projecting partially from the recess, partially embedding the element in the position it is ultimately to assume in a first temporary holding medium located in the recess, embedding the remainder of the element in a second temporary holding medium, removing the first temporary holding medium while the second temporary holding medium remains in position on said holder and while the element is retained in position in the recess in the holder by the second temporary holding medium, flowing into the space created by removal of the first temporary holding medium a permanent holding medium, and removing the second temporary holding medium after the permanent holding medium has set.

3. The method of securing a diamond or similar cutting or abrading element in a holder including the steps of forming in the holder a recess in which the element is to be secured while projecting partially from the recess, partially filling the recess with a first temporary holding medium, partially embedding the element in the holding medium in the position it is ultimately to assume, embedding the remainder of the element in a second temporary holding medium, removing the first temporary holding medium while the second temporary holding medium remains in position on said holder and while the element is retained in position in the recess in the holder by the second temporary holding medium, and flowing into the space created by removal of the first temporary holding medium a permanent holding medium.

4. The method of securing a diamond or similar cutting or abrading element in a holder including the steps of forming in the holder a recess in which the element is to be secured while projecting partially from the recess, partially filling the recess with a first temporary holding medium that is liquifiable and vaporizable by heat, partially embedding the element in the holding medium in the position it is ultimately to assume, embedding the remainder of the element in a second temporary holding medium, removing the first temporary holding medium by the application of heat while the second temporary holding medium remains in position on said holder and while the element is retained in position in the recess in the holder by the second temporary holding medium, and flowing into the space created by removal of the first temporary holding medium a permanent holding medium.

5. The method of securing a diamond or similar cutting or abrading element in a holder including the steps of forming in the holder a recess in which the element is to be secured while projecting partially from the recess, partially filling the recess with a first temporary holding medium that is liquifiable and vaporizable by heat, partially embedding the element in the holding medium in the position it is ultimately to assume, embedding the remainder of the element in a second temporary holding medium capable of withstanding heat, applying heat to the holder to remove the first temporary holding medium while the second temporary holding medium remains in position on said holder and while the element is retained in position in the recess in the holder by the second temporary holding medium, and flowing into the space created by removal of the first temporary holding medium a permanent holding medium.

6. The method of securing a diamond or similar cutting or abrading element in a holder including the steps of forming in the holder a recess in which the element is to be secured while projecting partially from the recess, partially filling the recess with wax in a soft state, partially embedding the element in the wax in the position it is ultimately to assume and holding the element in that position until the wax sets, embedding the remainder of the element in a cast of investment compound, applying heat to the holder to remove the wax while the investment compound remains in position on said holder and while the element is retained in position in the recess in the holder by the investment compound, and flowing solder into the space created by removal of the wax to hold the element permanently in position in the holder.

7. The method of securing a diamond or similar cutting or abrading element in a holder including the steps of forming in the holder a recess opening through a face of the holder in which recess the element is to be secured while projecting partially from the recess, forming in the holder a passage communicating at its inner end with said recess and opening outwardly of the holder at its other end, filling the recess with a first temporary holding medium that is liquifiable by heat, embedding the element in the holding medium in the position it is ultimately to assume, embedding the remainder of the element in a second temporary holding medium, applying heat to the holder to liquify the first temporary holding medium and permitting the same to run off through the passage while the element is retained in position in the recess in the holder by the second temporary holding medium, and feeding through the passage and into the space created by removal of the first temporary holding medium a permanent holding medium.

8. The method of securing a diamond or similar cutting or abrading element in a holder including the steps of forming in the holder a recess opening through a face of the holder in which recess the element is to be secured while projecting partially from the recess, forming in the holder a passage communicating at its inner end with said recess and opening outwardly of the holder at its other end, filling the recess with a first temporary holding medium that is liquifiable by heat, embedding the element in the holding medium in the position it is ultimately to assume, embedding the remainder of the element in a second temporary holding medium, applying heat to the holder to liquify the first temporary holding medium and permitting the same to run off through the passage while the element is retained in position in the recess in the holder by the second temporary holding medium, and pushing into the holder through the passage a rod of a permanent metallic holding medium while the holder is still hot.

9. The method of securing a diamond or similar cutting or abrading element in a holder including the steps of forming in the holder a recess in which the element is to be secured while projecting partially from the recess, partially embedding the element in the position it is ultimately to assume in a first temporary holding medium located in the recess, forming a mold about the end of the holder having the recess therein, casting into the mold a second temporary holding medium for embedding therein the remainder of the element, removing the first temporary holding medium while the second temporary holding medium remains in position on said holder and while the element is retained in position in the recess in the holder by the second temporary holding medium, and flowing into the space created by removal of the first temporary holding medium a permanent holding medium.

10. The method of securing a diamond or similar cutting or abrading element in a holder including the steps of forming in the holder a recess opening through a face of the holder in which recess the element is to be secured while projecting partially from the recess, forming in the holder a passage communicating at its inner end with said recess and opening outwardly of the holder at its other end, filling the recess with a first temporary holding medium that is liquifiable by heat, embedding the element in the holding medium in the position it is ultimately to assume, forming a mold about the portion of the holder having the recess therein, casting in the mold a second temporary holding medium in which is embedded the remaining projecting portion of the element, applying heat to the holder to remove the first holding medium by flowing thereof through the passage while the element is retained in position by the second temporary holding medium, and flowing through the passage into the space created by removal of the first temporary holding medium a permanent holding medium.

11. The method of making a tool tipped with a diamond or similar cutting or abrading element including the steps of providing a holder, forming in the holder a recess in which a cutting or abrading element is to be secured while projecting partially from the recess, partially filling the recess with a first temporary holding medium, partially embedding an abrading element in the holding medium in the position it is ultimately to assume, embedding the remainder of the element in a second temporary holding medium, removing the first temporary holding medium while the second temporary holding medium remains in position on said holder and while the element is retained in position by the second temporary holding medium, and flowing into the space created by removal of the first temporary holding medium a permanent holding medium.

12. The method of making a tool tipped with a diamond or similar cutting or abrading element including the steps of providing a solid cylindrical metal shank, forming in the shank a longitudinally extending recess opening through one end of the shank and a passage extending from the recess radially outwardly and away from the recess to open through the side wall of said shank, partially filling the recess with a first temporary holding medium, partially embedding a cutting or abrading element in the holding medium in the position it is ultimately to assume, casting over the end of said shank a second temporary holding medium in which the remainder of the element is embedded, removing the first temporary holding medium while the element is retained in position by the second temporary holding medium, and flowing through the passage into the space created by removal of the first temporary holding medium a permanent holding medium.

13. The method of making a tool tipped with a diamond or similar cutting or abrading element including the steps of providing a solid cylindrical shank, forming in the shank a longitudinally extending recess opening through one end of the shank, and a passage leading from near the bottom of the recess radially outwardly and away from the recess to open through the side of said shank, partially filling the recess with a first temporary holding medium that is liquifiable and vaporizable by heat, the medium being placed in the recess in a soft condition, partially embedding a cutting or abrading element in the holding medium in the position it is ultimately to assume and holding the element until the medium sets, winding a strip of stiff tape about the end of the shank to form a cup-like mold, casting in the mold a second temporary holding medium to embed therein the remainder of the element, applying heat to the shank while supported in an upright position to melt out and flow out through the passage the first temporary holding medium while the element is retained in position by the second temporary holding medium, and forcing into the passage an attenuated piece of solder until the space created by removal of the first holding medium is again completely filled firmly and rigidly to embed the element in the shank.

14. The method of embedding a diamond or similar cutting or abrading element in a holder including the steps of forming in the holder a recess in which the element is to be secured, forming a passage communicating at its inner end with said recess and opening outwardly of the holder, substantially filling the recess with a moldable and liquifiable compound in a softened state, placing the element in the compound in the partially projecting position it is ultimately to have and holding the same until the compound sets, casting a compound over the projecting portion of the element, removing the liquifiable compound and flowing into the recess a metallic compound while the element is held in position in the recess in the holder by the cast compound.

15. The method of embedding a diamond or similar cutting or abrading element in a holder including the steps of forming in the holder a recess in which the element is to be secured, forming a passage communicating at its inner end with said recess and opening outwardly of the holder, substantially filling the recess with a moldable and liquifiable compound in a softened state, placing the element in the compound in the partially projecting position it is ultimately to have and holding the same until the compound sets, forming about the end of the holder a mold projecting outwardly thereof, casting in the mold and about the projecting portion of the element a non-metallic compound, removing the liquifiable compound and flowing into the recess a metallic compound while the element is held in position by the cast compound.

16. The method of making a tool tipped with a diamond or similar cutting or abrading element including the steps of providing a cylindrical shank, forming in the shank a plurality of generally longitudinally extending recesses opening through one end of the shank, forming in the shank a passage opening at its outer end through the side of said shank and extending inwardly and toward the end of said shank and communicating directly or through branch passages with said recesses, partially filling the recesses with a first temporary holding medium that is liquifiable and vaporizable by heat, the medium being placed in the recesses in a soft condition, partially embedding a cutting or abrading element in the holding medium in each of the recesses in the position it is ultimately to assume, winding a strip of stiff tape about the end of the shank to form a cup-like mold encompassing all of the recesses, casting in the mold a second temporary holding medium to embed therein the projecting portions of the elements, applying heat to the shank while supported in an upright position to melt out and flow out through the passage and its branches the first temporary holding medium while the elements are retained in position by the second temporary holding medium, and forcing into the passage an attenuated piece of solder until the spaces created by removal of the first holding medium are again completely filled firmly and rigidly to embed each element in its recess.

JAN TAEYAERTS.
MAGNUS TOELCKE.